May 1 1934.  M. CHARLES  1,956,668
HYDROPNEUMATIC SHOCK ABSORBER
Filed Oct. 8, 1932
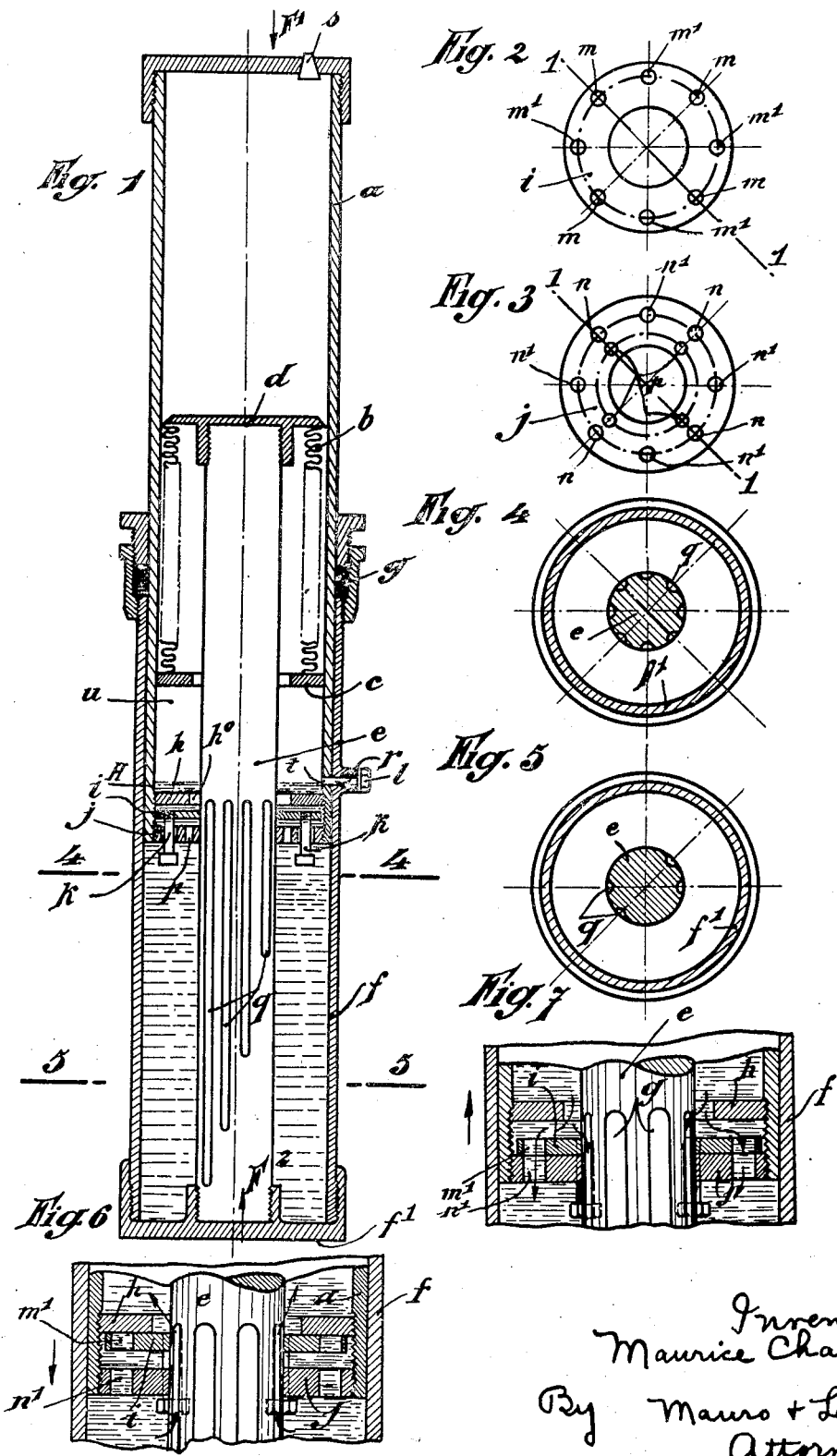

Patented May 1, 1934

1,956,668

UNITED STATES PATENT OFFICE 1,956,668

HYDROPNEUMATIC SHOCK ABSORBER

Maurice Charles, Courbevoie, France

Application October 8, 1932, Serial No. 636,926
In France October 19, 1931

5 Claims. (Cl. 267—64)

My invention concerns hydro-pneumatic shock absorbers for motor vehicles and other uses and its object is to provide a shock absorber of that type in which the suspension of the vehicle is ensured through a piston or bellows bearing upon a cushion of compressed air at a suitable pressure, while the shocks are absorbed by causing a liquid to flow through grooves of decreasing cross section or of constant cross section and decreasing length, the flow of the liquid being preferably controlled through a valve provided with holes adapted to move between two rings which act as seats for said valve and are provided with suitable orifice or conduits adapted to cooperate with said valve.

A preferred embodiment of my invention will be hereinafter described with reference to the accompanying drawing, given merely by way of example, and in which:

Fig. 1 is a longitudinal sectional view of the apparatus on the line 1—1 of Figs. 2 and 3;

Fig. 2 is a plan view of the valve showing the holes therein;

Fig. 3 is a plan view of the lower seat of the valve;

Fig. 4 is a sectional view on the line 4—4 of Fig. 1;

Fig. 5 is a sectional view on the line 5—5 of Fig. 1;

Figs. 6 and 7 are fragmentary sectional views at an enlarged scale, showing said valve in two different positions.

A cylinder $a$, closed at the upper end, is provided with a piston $d$ arranged to form a fluidtight partition between the upper part of said cylinder and the lower part thereof, so that the space at the top of said cylinder limited by said partition may form an air chamber of variable volume. In the specific embodiment illustrated by Fig. 1, an airtight joint is obtained by means of bellows $b$, fixed at one end to the periphery of said piston and at the other end to a ring $c$ rigidly fixed to the inner wall of cylinder $a$. But of course any airtight joint between piston $d$ and cylinder $a$ can be used according to my invention.

The rod $e$ of the piston $d$ is fixed through its lower end to the end $f^1$ of a second cylinder $f$ in which cylinder $a$ is slidably fitted, the fluid-tightness between the two cylinders being obtained through a packing device $g$.

Cylinder $a$ extends beyond annular partition $c$ and its inner end is provided with a series of three annular members, $h$, $i$, $j$ through which piston rod $e$ passes. One of said annular members, $i$, can slide in a direction parallel to the piston rod, so as to act as a valve, while the two other annular members, $h$ and $j$, are fixed to tube $a$ and form the lower seat and the upper seat of the valve.

A relatively large free space $h^o$ is provided between rod $e$ and the upper seat $h$ of the valve. On the contrary, valve $i$ and its lower seat $j$ are exactly fitted on said rod $e$.

Eight equidistant holes are provided in valve and its lower seat, as shown in Fig. 2, and the holes in valve $i$ register with those in the lower seat $j$ of said valve. Four of the holes provided in ring $i$ (those corresponding to reference character $m$) are screw threaded so as to receive the threaded end of small rods $k$ extending freely through the corresponding holes $n$ of annular member $j$, so as to guide the valve with respect to its seat. Under these conditions, the holes $m^1$ and $n^1$ of annular members $i$ and $j$ respectively through which the liquid is allowed to flow are exactly in line with one another, as shown in Fig. 7, when the valve is applied against its lower seat. Said lower seat $j$ of valve $i$ is also provided with four other holes $p$ for the flow of the liquid.

Finally, piston rod $e$ is provided, at a height substantially level with the seat $h$ of the valve, with a series of grooves $q$ (eight in the case of the example shown in the drawing) of unequal length; and tube $f$ is provided with an orifice $r$ for filling it with liquid and keeping a constant level of said liquid in said tube, said orifice being closed by means of a fluidtight stopper with a vent hole $l$. When tube or cylinder $a$ is in its upper position, the orifice $r$ is located opposite an orifice $t$ of said cylinder.

The apparatus according to my invention operates as follows:

Supposing the apparatus to be fully extended as shown in Fig. 1 (cylinder $a$ is prevented, through a stop, not shown in the drawing, from sliding out from tube $f$), compressed air at a suitable pressure is introduced through a fluidtight valve $s$, into tube $a$, and a liquid is poured into tube $f$ up to level H through orifice $l$.

The apparatus is then ready to work and if a quickly increasing load is applied at each end of the shock absorber, as diagrammatically shown by arrows $F^1$ and $F^2$, the said load will cause tubes $a$ and $f$ to slide in a telescopic manner with respect to each other, which will result in bellows $b$ being stretched, and the air present in the upper part of tube $a$ getting more and more compressed.

On the other hand, the liquid present in the lower part of tube $f$ will be caused to flow into chamber $u$, comprised between the annular member $c$ of cylinder $a$ and the annular member $h$, said liquid passing through orifices $n^1$ and $p$ of seat $j$ and orifices $m^1$ of valve $i$. But the upward flow of the liquid causes said valve $i$ to move upwardly, and when said valve is applied against its upper seat $h$, its orifices are closed by said upper seat, so that the liquid can no longer flow through them into chamber $u$, as shown in Fig. 6.

The only way for the liquid to pass from the lower part of tube $f$ into chamber $u$ is then to flow through the grooves of piston rod $e$, as shown by the arrows of Fig. 6, the number of grooves available for said flow of the liquid decreasing gradually as tube $a$ is being forced into tube $f$ (Figs. 4 and 5).

The braking action resulting from the flow of the liquid through said grooves therefore increases in intensity as the displacement due to a shock, or the speed of said shock increases.

When the load applied to the shock absorber is removed, the air pressure above piston $d$ causes the liquid present in chamber $u$ above annular member $h$ to flow back into the lower part of tube $f$, so that valve $i$ is immediately applied against its lower seat. The orifices of said valve then come back in register with those of the under seat $j$ (as shown in Fig. 7) and the shock absorber is rapidly brought back to its initial position, the flow of the liquid taking part freely in the direction of the arrows of Fig. 7.

Although it is generally preferable that the return flow of the liquid should take place freely through orifices $m^1$ and $n^1$, as above explained, attention is called to the fact that annular members $h$, $i$, $j$ could be so arranged that the braking action resulting from the passage of the liquid through the grooves would take place in both directions.

In a more general manner, it should be well understood that while I have described what I deem to be a practical and efficient embodiment of my invention, I do not wish to be limited thereto as there might be changes made in the arrangement, disposition and form of the parts without departing from the principle of my invention as comprehended within the scope of the appended claims.

What I claim is:

1. A hydro-pneumatic shock absorber for connecting two bodies adapted to move with respect to each other, which comprises in combination, two cylinders adapted to be secured to said bodies respectively and slidably fitted in each other in a fluidtight manner, said cylinders being closed at their outer ends, a piston adapted to slide in a fluidtight manner in one of said cylinders, a mass of compressed air between the outer end of said cylinder and said piston, a rod for said piston rigidly fixed to the outer end of the other cylinder, and provided with grooves in its periphery the total cross section of which decreases toward the outer end of the second mentioned cylinder, a mass of liquid in said second mentioned cylinder, an annular valve provided with holes slidably mounted in the first mentioned cylinder and fitting on said piston rod, an annular member rigidly fixed to said first mentioned cylinder on one side of said valve so as to form a seat for it and provided with holes corresponding with those in the valve, means for guiding said valve in fixed angular relation with respect to said annular member so that the holes in these two parts register exactly and another annular member rigidly fixed to the first mentioned cylinder on the other side of said valve so as to form another seat for said valve, the last mentioned annular member being so formed as to leave a free annular space between itself and the piston rod.

2. A hydro-pneumatic shock absorber according to claim 1 in which the grooves in the piston rod are of constant cross section but of different lengths.

3. A hydropneumatic shock absorber for connecting two bodies adapted to move with respect to each other, each comprising in combination, two cylinders adapted to be secured to said bodies respectively and slidably fitted in each other in a fluidtight manner, said cylinders being closed at their outer ends, a piston adapted to slide in a fluidtight manner in one of said cylinders, a mass of compressed air between the outer end of the last mentioned cylinder and said piston, a rod for said piston rigidly fixed to the outer end of the other cylinder and provided with grooves in its periphery, the total cross section of which decreases toward the outer end of the second mentioned cylinder, a mass of liquid in said second mentioned cylinder, an annular partition rigidly fixed to the first mentioned cylinder so as to leave a free annular space between itself and the piston rod, a second partition fixed to said first mentioned cylinder at a certain distance from the first mentioned partition and fitting exactly on said piston rod, the second mentioned partition being provided with apertures, and valve means interposed between said two partitions for allowing the liquid to flow through said free space of the first mentioned partition and said apertures of the second partition in one direction, and causing it to flow merely between said second partition and the bottom of said grooves in the opposite direction.

4. A hydropneumatic shock absorber according to claim 1, further comprising an annular partition fixed to the first mentioned cylinder above said annular members so as to leave a free space between itself and the piston rod, the piston consisting of a disc fixed to the upper end of said piston rod, and annular bellows fluid tightly fixed at one end to the periphery of said disc, and at the other end to the last mentioned annular partition.

5. A hydropneumatic shock absorber according to claim 3, further comprising an annular partition rigidly fixed to the first mentioned cylinder above the two first mentioned partitions, the piston consisting of a disc fixed to the upper end of said piston rod, and annular bellows fluidtightly fixed at one end to the periphery of said disc, and at the other end to the last mentioned annular partition.

MAURICE CHARLES.